Fig.3.

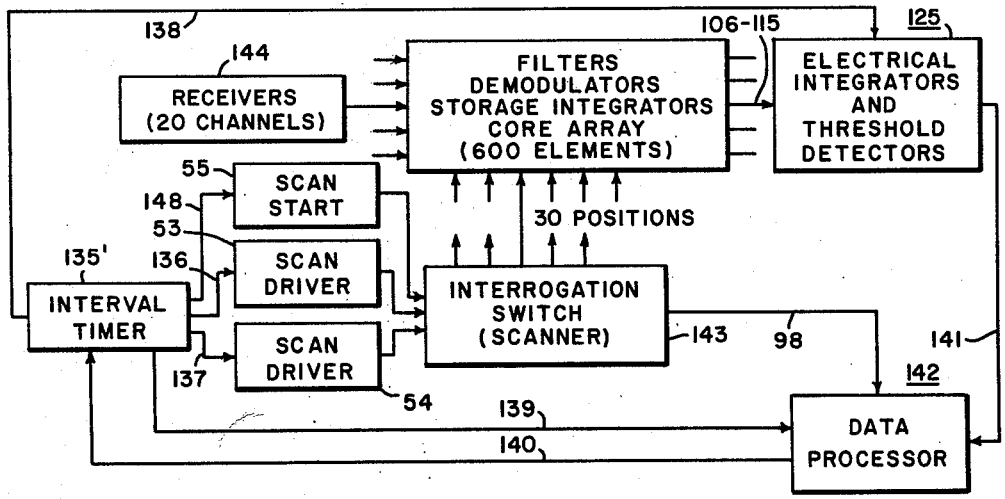

United States Patent Office 3,181,149
Patented Apr. 27, 1965

3,181,149
SIGNAL DATA EXTRACTION CIRCUIT AND METHOD EMPLOYING MAGNETIC AND OTHER SOLID STATE DEVICES
Norman L. Weinberg, Baltimore, and Ralph J. Metz, Ellicott City, Md., assignors to Westinghouse Electric Corporation, East Pittsburgh, Pa., a corporation of Pennsylvania
Filed Oct. 24, 1960, Ser. No. 64,372
15 Claims. (Cl. 343—8)

This invention relates to improvements in signal data extraction methods and circuitry and more particularly to an improved signal data extraction circuit employing magnetic core storage integrators and magnetic core scanner devices for interrogation, especially suitable for use in data processing in pulse Doppler radar equipment.

In coherent radar systems utilizing the Doppler shift phenomenon, the shift in frequency of the received signal spectrum is proportional to the radial velocity between the transmitting source and the target, and if suitably measurable will become a source of information about a particular target parameter, range rate, which is the radial velocity. It is customary for the volume of possible target parameters surveyed by a radar system to be quantized along radial and angular coordinates. The angular quantization is a function of the antenna, while quantization in the radial coordinate takes place within the confines of an individual angular quantum.

As is well known, detection of signals in random noise such as is introduced by all practical antennas and receivers is materially aided by reducing the band-width through which the corrupted signal, that is, the received signal plus the noise, passes before a detection decision is made. It has been found that the Doppler shift in frequency of a radar echo signal is measurable to a satisfactory degree of resolution by using a large number of contiguous narrow band-width channels covering the Doppler shift frequency range of information which is of significance. In effect, the continuum of values of frequency is quantized such that the band-width of one of the frequency channels is one quantum. This frequency channelizing coincides with the band-width reduction made necessary or desirable by the requirements of signal detection. Accordingly, pulse Doppler radar apparatus frequently employs a receiver system which is a multi-channel system in which the Doppler frequency resolution is carried out by a separate bank of contiguous frequency filters in each channel. To examine the output condition of this matrix, some method of high speed sequential interrogation is employed. This sequential interrogation is part of the basic signal data processing, the data organization process making use of these detection decisions which are binary or two-state yes-no in nature, and according to established rules arranges this information into sets describing a particular target. The inventive concept visualizes that this processing of data may be handled by conventional digital data handling techniques and equipment of conventional design.

In summary, the apparatus of the instant invention provides a new and improved technique using a core-transistor circuit which at once performs the function of a narrow-band filter and a demodulator, the output of which is applied to the storage winding of a magnetic core storage integrating device, the transistor circuit also providing isolation of the magnetic core storage integration device when the interrogation or readout drive signal is applied thereto. A plurality of magnetic core storage integrating elements are provided each having a storage or integrate drive winding, a sense or output winding, and an interrogation or reset winding. These storage elements are connected in a circuit with other magnetic core scanner devices to which a pair of pulsed signals having predetermined time relationships are provided, resulting in the sequential interrogation of the entire bank of storage elements in a predetermined time interval. The outputs of groups of these storage elements, represented by signals induced in the sense windings during the readout process, are applied to electrical integrators, the outputs of which are applied to threshold detectors which supply their output to data processing equipment.

Accordingly, it is a primary object to provide new and improved data extraction method and apparatus.

Another object is to provide new and improved magnetic core storage integration apparatus.

Another object is to provide a new and improved core-transistor circuit for use in signal data extraction equipment providing filtering, demodulation, and isolation between a signal source and an integrating storage element.

Another object is to provide new and improved data extraction apparatus especially suitable for use in Doppler radar.

These and other objects will become more clearly apparent after a study of the following specification when read in connection with the accompanying drawings, in which:

FIGURE 3 is a schematic electrical circuit diagram of magnetic core storage integrators and the circuit of magnetic core scanner devices for sequentially interrogating the magnetic core storage integrators to provide electrical signal outputs for utilization in the electrical integrators and threshold detectors for providing signals for application to the data processor;

FIGURE 6 is one example of an electrical circuit diagram of apparatus suitable for generating the pulses of FIG. 4 and applying the pulses to the core array of FIG. 3; the circiut of FIG. 6 is not a part of this invention but is included to facilitate an understanding of this invention;

FIG. 7 is an electrical circuit diagram in block form showing the relationship of the filters, demodulators and storage integrators to the scanning apparatus and the remainder of a complete circuit for processing and utilizing data obtained in Doppler radar apparatus.

Figure 1:
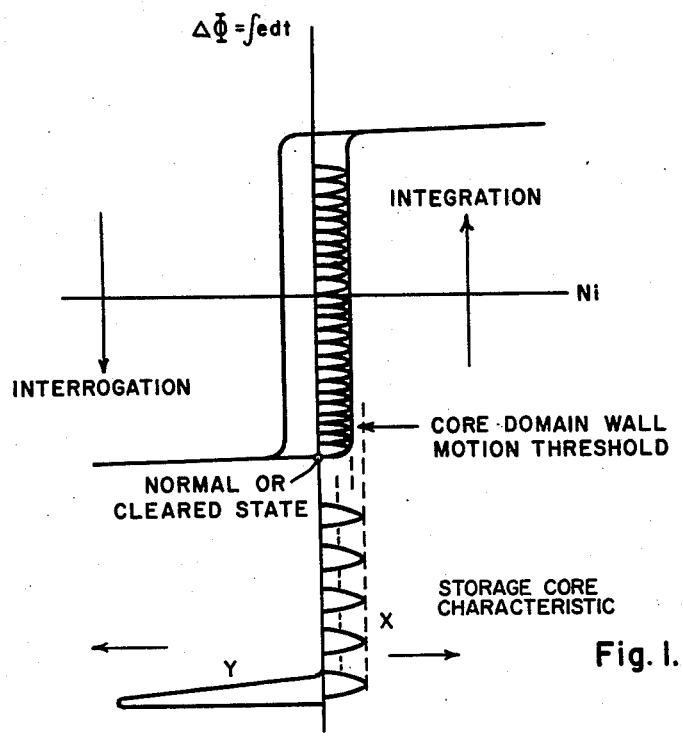
FIGURE 1 is a diagram illustrating the magnetic characteristics of the magnetic core storage integrator devices or elements.
Figure 2:
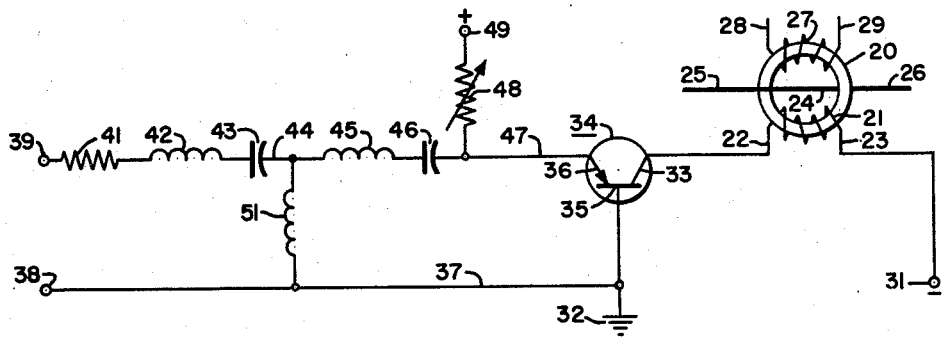
FIGURE 2 is an electrical circuit diagram of one of a plurality of channels, each comprising a filter, transistor demodulator and isolator for applying the output of the filter to the storage winding of a storage integration element.

Referring now to the drawings in which like reference characters are used throughout to designate like parts for a more detailed understanding of the invention, and in particular to FIG. 2, there is shown designated 20 the magnetic core of one storage integrator unit. The core 20 is composed of a rectangular loop material, for example, a material known in the trade as Hipernik V. The static flux current loop for a core of this type of material is illustrated in FIG. 1, to which further reference will be made hereinafter. The core 20 is coupled through two separate drive windings to two driving circuits and provides a signal in a third winding in a third circuit, the sense or output circuit. One of the drive windings, the integrate drive winding, as designated 21 and has leads 22 and 23 connected thereto. The sense or output winding may be a single turn and is designated 24 having leads 25 and 26. The integrate drive or reset winding is designated 27 and has leads 28 and 29.

The aforementioned lead 23 of storage winding 21 is connected to one terminal 31 of a suitable source of direct current energizing potential, not shown, having the other terminal thereof connected to ground 32. The aforementioned lead 22 connected to the other end of storage winding 21 is connected to the collector 33 of a transistor generally designated 34 having a base 35 and emitter 36, the base 35 being connected by way of lead 37 to ground 32. Lead 37 is connected to one input terminal 38 which it is understood is connected to radar receiving apparatus for supplying a signal having a frequency component corresponding to the Doppler shift frequency. The other input terminal 39 connected to the radar receiving apparatus is connected by way of resistor 41, choke 42, capacitor 43, lead 44, choke 45, capacitor 46, and lead 47 to the aforementioned emitter 36. Lead 47 is connected by way of variable resistor 48 to terminal 49 which is connected to a suitable source of direct current emitter energizing or biasing potential, not shown, having the other terminal thereof connected to ground 32. Connected between lead 44 and the aforementioned lead 37 is an inductor 51.

In understanding the operation of the apparatus of FIG. 2, it should be kept in mind that the object of this portion of the circuit is to separate the various frequency components of an incoming radar return signal and to detect signals above an assigned threshold in the presence of noise. The circuit portion of FIG. 2 accomplishes band-pass filtering, demodulation and subsequent integration of the combined signal and noise prior to observation, that is, readout. The circuit as beforementioned provides adequate decoupling or isolation so that mechanization of any of the functions does not interfere with operation of any other portion of the circuit or system. The elements including inductor 42, capacitor 43, inductor 45, capacitor 46 and inductor 51 comprise a linear two pole filter, and the component values are selected such that the required band-width is obtained for a specified center frequency which falls within the Doppler frequency shift of the radar apparatus. The resistor 41 is a linear resistor which is utilized to adjust the insertion loss to a desired design value. The type of inductors including the core material and geometry utilized is selected in accordance with the frequency range which it is desired to cover. The transistor 34 may be a P-N-P germanium alloy junction transistor. The circuit, however, is not restricted to the use of this type. As aforementioned, the core 20 is the storage integrator core having magnetic characteristics which will be described in greater detail hereinafter.

The input signal from the radar receiver applied to terminals 38 and 39 is mainly noise from which several frequencies of interest must be extracted. These frequencies represent the target range rates. The aforementioned linear filter extracts the frequency component(s) lying within its band-width and drives the emitter-base circuit of the grounded base transistor 34. This signal current adds to a direct current bias current flowing from terminal 49 through resistor 48 and causes a collector current $\alpha I_e$ to drive the winding 21 coupled to the storage integrator core 20. If the total current exceeds the domain wall threshold current level of the core, flux change will occur. The amount of flux change depends on the signal characteristics of amplitude and observation time. Demodulation is accomplished by the transistor since only unidirectional currents are supplied by the collector 33. The induced voltage on winding 21 caused by the interrogate drive signal applied to the other drive winding 27 during the readout process is in such a direction as to back-bias the collector-base junction of transistor 34. Thus, transistor action isolates the core circuit from the filter circuit during the readout operation.

As will be readily understood, the storage integrator core 20 requires a current source drive or winding 21, since a low impedance in this circuit would interfere with the proper operation of the scanner. The collector circuit of the transistor 34 provides a high impedance drive thus satisfying this requirement. As previously explained, isolation is also obtained since the induced voltage in winding 21 during readout is in such a direction as to back bias the collector-base junction. This isolation is needed since the induced voltage pulse during readout is very high compared to the voltage due to the integrate drive signal or winding 21 from the filter. This large pulse could, if not isolated, couple energy through the filter in the reverse direction, possibly ringing adjacent filters tied together at the common input.

With respect to the filter portion of the circuit, the filter circuit approximates a constant current source to the output, since the filter driving point impedance as seen from the output terminals is considerably greater than the input impedance of the grounded base transistor circuit. Normal variations in the $h_{ib}$ characteristic of commercially available transistors therefore have negligible effect on the current output of the filter.

The grounded base transistor circuit has stable input characteristics and stable transfer characteristics permitting one to utilize germanium alloy junction transistors of relatively low cost.

The bias circuit serves several useful functions; by adjusting the bias current the apparatus can be compensated for normal variations in core threshold current. In addition, a user of the apparatus by controlling the B+ supply at terminal 49 can obtain temperature compensation, if required. Capacitor 46 serves the additional function of blocking direct current from the filter circuit, thus saving a component.

The filter circuit could be altered if desired to utilize a capacitor as the coupling element, whereas the circuit as illustrated in FIG. 2 utilizes the inductor 51. The frequency detection channel is not limited to two pole L-C filters but can employ other filtering devices if desired such as a crystal filter, a ceramic disk filter, or other L-C configurations.

Particular reference is made again to FIG. 1. As will be readily understood, in this particular system it is required that the integrated signal information not be retained after reading out. This is necessary if a user of the apparatus is to correlate the outputs from successive integration times. During readout the core is reset to its cleared state, thus removing all information stored during the previous integration period. Cores of the type described can utilize a common sense winding where a large number of integrators are employed and a readout signal in the sense winding from one core will not affect the others since the current in the sense circuit will be limited well below the core threshold. Thus, this core provides for a non-interacting mixing of outputs, a necessary condition in any information switching system.

The threshold is a function of the core itself; currrents below the value corresponding to the static coercive force will not change the flux. The only signals that will be integrated are those above this threshold. In design this threshold can be set by choosing the proper number of turns and the proper signal level; practical circuit impedance levels are compatible with the magnetic core.

Another advantage is that information stored in the core is permanent if not read out and thus if a power failure occurs the information stored in the core is not destroyed. The cores are small, light and economical thus satisfying these important requirements for airborne equipment. For signals greater than the threshold, integration is obtained for a defined amplitude region and time period. Flux level is therefore an indication of observation time and signal strength. The core used in this manner therefore provides a simple mechanization for the important signal processing function. As explained above, integration can be obtained by utilizing a current source drive for the information or integrate drive winding 21. As is readily understood, with small cores voltage source impedance requirements may be extremely severe. By using the mode of operation contemplated, an integration effect is obtained with a current source thus enabling the use of simple circuitry. From the foregoing, it will be apparent that the present invention provides integration of signals by storage of magnetization in magnetic cores as distinguished from the electrical signal integration by R-C networks. Also, a certain amount of amplitude discrimination is obtained by reason of the fact that signals of an amplitude below the threshold value necessary to overcome the static coercive force of the domain wall will not add to the magnetization.

The comb-like configurations shown in FIG. 1, represent voltage-second areas which may be considered as analogues of the stored magnetization corresponding to each signal from a "look" interval, that is, the interval during which the output from the radar receiver is gated into the plurality of channels previously mentioned. As represented in FIG. 1, any signal greater than the threshold value will produce one of the voltage-second areas. As is conventional in such diagrams, the Y-axis represents time. As represented by the arrow on the right-hand side of FIG. 1, during the integration process, time may be considered to move vertically upwardly, and as represented by the arrow at the left-hand side of FIG. 1, time may be considered to run vertically downward during the interrogation process. The areas voltage-second are, so to speak, piled one on top of the other, beginning with the negative remanent or cleared state and represent the integrated successive signal components in the respective channels which are above the threshold value. It is to be clearly understood, of course, that FIG. 1 symbolizes the action taking place in only one given channel. Similar action takes place in all of the other channels.

Considering again the movement of time vertically upwardly during integration, the successive half wave loops represent successive positive loops of the Doppler frequency envelope. During integration time is considered to move upwardly and since all are above the threshold value they will be stored successively as voltage-second areas in the contiguous comb-like configurations in the order in which they are coupled into the storage integrator core. It will be apparent that the leading signals will be stored in the same order as the movement of time along the axis, that is, the first pulse will be stored first in the core and then the magnetization resulting from the second pulse will be stored on top of the magnetization from the first pulse, and so forth. If one of the pulses was of an amplitude below the threshold value, it would not be recorded in the core as a voltage-second area. During the interrogation process, the total stored flux in the magnetic core is reversed by the large pulse extending to the left at the bottom of FIG. 1. This causes the stored signal information in the core to be read out into the data processing components as hereinafter explained. The interrogation pulse also resets the core.

A further discussion of the above described integration process appears in an article by N. L. Weinberg, J. M. Walker, and R. J. Metz entitled "Rapid Detection of Coherent Signals in Noise," appearing in Part 8 of the I.R.E. National Convention Record, March 24, 1960.

Figure 3:
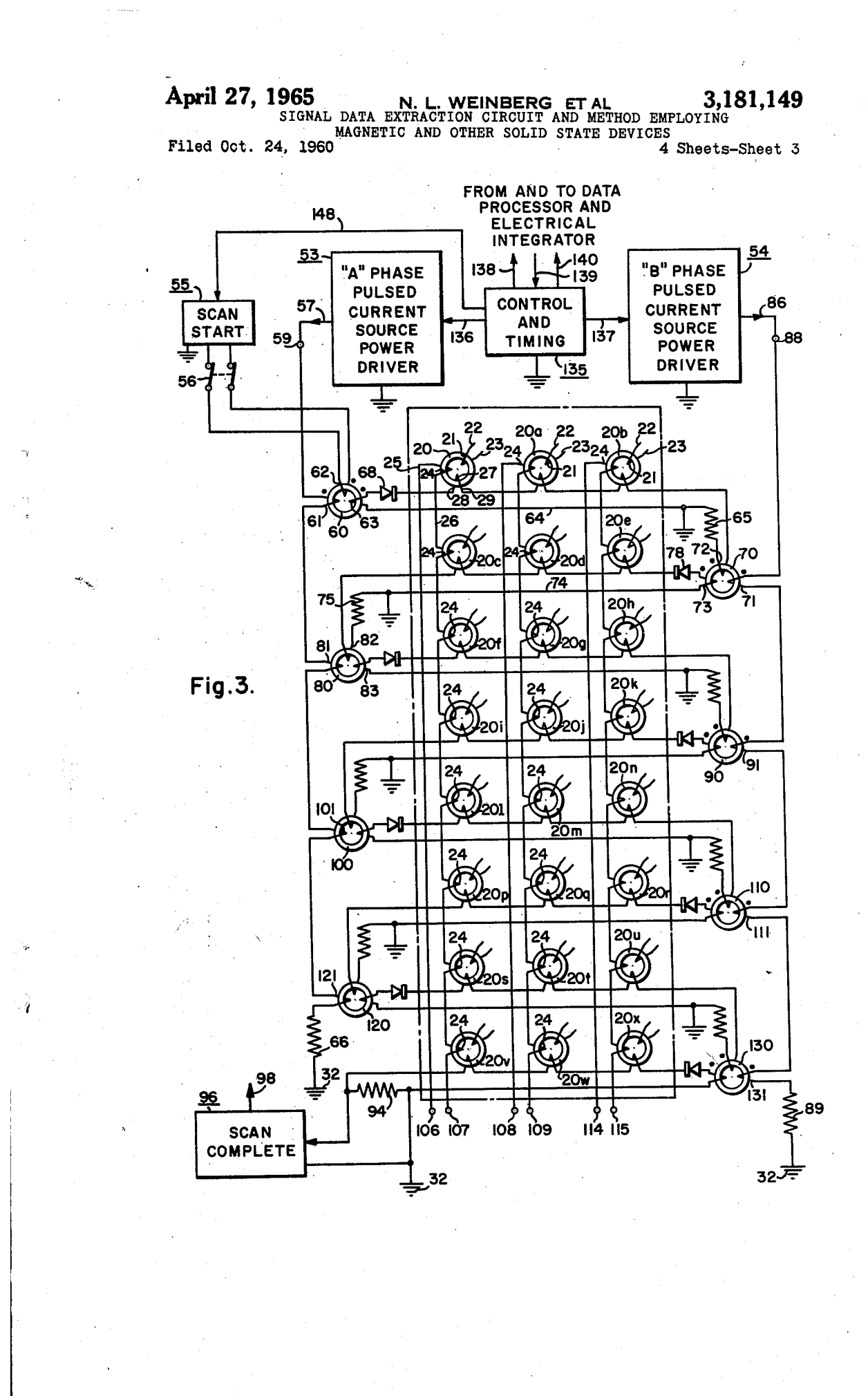

Particular reference is made now to FIG. 3, in which there is shown a scanning circuit for sequentially interrogating a group of magnetic storage integrator cores employed as post-detection integrators in accordance with the foregoing description of the operation of FIG. 2 and FIG. 1. As previously stated, non-interacting mixing of the core outputs is a requirement, and this is provided by the circuit of FIG. 3. Another requirement for use in radar is that the scanner must also be under control of the radar or data organizing systems so that the scanning process can be stopped at any position, and such is contemplated in the instant invention. In FIG. 3 there are shown in block form current sources 53 and 54 for providing pulses "A" and pulses "B" having a time relationship such as those shown in FIG. 4. The current sources A and B are bi-phase alternating current pulses capable of supplying the necessary pulse power for actuation of the magnetic core scanner. As shown in FIG. 5, resembling a B-H curve for square loop material, the pulses "A" and "B" are of more than sufficient amplitude to change or switch the flux in a scanner core between a set remanent state of one polarity and a reset remanent state of the other polarity, the excess current not used or lost in core switching being dissipated in a resistive load. In FIG. 3, the scanner device core 60 is a rectangular loop magnetic core such as Hipernik V, having a flux current loop as shown in FIG. 5. Similar rectangular loop magnetic cores are shown at 70, 80, 90, 100, 110, 120 and 130. Each of the magnetic cores 60, 70, 80, 90, 100, 110, 120 and 130 has three windings, the windings of core 60 being designated 61, 62 and 63, the windings of core 70 being designated similarly as 71, 72, 73, the windings of core 80 being designated 81, 82, 83 and the windings of the other scanner cores being similarly designated. Winding 62 is seen to be connected to a "scan start" circuit shown in block form and generally designated 55, by way of a suitable terminal or switch device 56. The output of the aforementioned A phase pulse current source power driver is connected by lead means 57 to a terminal 59 and it is seen that windings 61, 81, 101 and one terminal of winding 121 are connected in series to terminal 59, and the other terminal of winding 121 is connected by way of resistor 66 to ground 32.

One terminal of winding 63 associated with the core 60 is connected by way of lead 64 and resistor 65 to one terminal of winding 72 associated with core 70. Interconnected between the other terminal of winding 63 and the other terminal of winding 72 are series-connected interrogation, readout, and reset windings 27 of a plurality of storage cores 20, 20a and 20b having connected in series therewith the diode 68 which is directly connected to one terminal of the aforementioned winding 63. Whereas three cores 20, 20a and 20b are shown as having their read-out or reset windings connected in series between winding 63 and winding 72, it will be understood that this bank of cores may include any desired number, three being shown merely for illustrative purposes.

The aforementioned winding 73 associated with core 70 has one terminal thereof connected by way of lead 74 and resistor 75 to one terminal of the aforementioned winding 82 associated with core 80. The other terminal of winding 82 has the readout or reset windings of cores 20c, 20d and 20e connected in series thereto, and these reset windings are also connected in series by way of rectifier 78 to the other terminal of the aforementioned winding 73.

The aforementioned B phase pulsed current source power driver generally designated 54 has the output thereof applied by lead means 86 to terminal 88. The windings 71, 91, 111 and one terminal of winding 131 associated with cores 70, 90, 110 and 130 respectively, are connected in series to terminal 88, and the other terminal of winding 131 is connected by way of resistor 89 to ground 32. The semiconductor diodes 68 and 78, and all of the other corresponding diodes in the circuit of FIG. 3 preferably have high conductance. The resistors 66 and 89 are terminations for the current sources 53 and 54, respectively. The "scan-stop" (scan complete) circuit 96 is a coupling circuit taking the induced voltage from the scanner core 130 in the final position of the scanner, developed across resistor 94, and communicating this signal to the radar system or to the data handling apparatus by lead means 98. The "scan start" circuit shown at 55 places the first scanner core in the negative remanent state, assuming that the current pulses from source 53 are positive, prior to the initiation of the scanning cycle. In the operation of the circuit of FIG. 3, assuming by way of description that the pulses from sources 53 and 54 are positive, before initiation of the scanning cycle all scanner cores 60, 70, 80, 90, 100, 110, 120 and 130 are in positive remanence. As previously stated, the start circuit sets the first core 60 to the negative remanent state sometime after the end of the previous cycle and prior to the succeeding cycle. The first current pulse from current source A resets the first scanner core 60 to positive remanence inducing a voltage in secondary winding 63. The current flows in the secondary winding 63 through the circuit comprising diode 68, winding 27, resistor 65 and winding 72, the secondary winding being a high impedance circuit since the core is coupled to a current source, and resets the storage integrator cores 20, 20a and 20b. In this process of resetting, a voltage is induced in the sense circuit winding 24 of each core whose volt-second area is proportional to the flux level stored in the core. This flux level is the desired information in the integrator core.

In addition to resetting the storage integrator cores, the current in this aforementioned circuit of winding 63 flows through winding 72 and sets the scanner in the second position, that is scanner core element 70, to its negative remanent state. The first current pulse from current source B designated 54 resets scanner core 70 to its positive remanent state, inducing a voltage in its secondary winding 73 which resets the storage integrator cores on its line, that is, the cores 20c, 20d and 20e similarly to the cores 20, 20a and 20b of the upper horizontal line. Scanner core 80 is set to its negative remanent or saturated state by current in winding 82 resulting from the induced voltage in winding 73 on core 70. The second current pulse from the current source A designated 53 acts on core 80 in a manner similar to that in which the first "A" pulse acted on core 60, and this process continues until the final core in the scanner shown here as 130 is switched.

The polarities of rectifiers 68, 78, etc. are chosen for proper circuit operation. The voltage induced in winding 72 or 82 although of the wrong polarity with respect to the diode does not cause any significant current flow since the turns are adjusted to limit this induced voltage below the diode forward characteristic threshold. When a scanner core is set at positive remanence, the circuit pulse has negligible effect since it drives the core further into saturation. Thus, the only core affected by the current pulse is the one which is to be switched.

The impedance in the sense circuit is designed such that the current flow due to the induced voltage in any one integrator core 20 is below the static threshold value of the other integrated cores. Thus, non-interacting mixing is accomplished.

The scanner can be stopped in any position by the control circuit which is a part of the radar system. This essentially provides asynchronous operation. As previously stated the "scan complete" or scan stop circuit shown in block form at 96 informs it that the last position has been scanned. This can then stop the current sources A and B from transmitting any additional pulses.

It will be readily understood that each of the cores 20, 20a, 20b and so forth has the winding 21 thereof connected by leads 22 and 23 to a transistor demodulator and isolator similar to that shown in FIG. 2. It will be seen that corresponding windings 24 of cores 20, 20c, 20f, 20i, 20l, 20p, 20s and 20v are connected in series across a pair of terminals 106 and 107; corresponding windings 24 of cores 20a, 20d, 20g, 20j, 20m, 20q, 20t and 20w are connected in series to a pair of terminals 108 and 109, and corresponding windings 24 of cores 20b, 20e, 20h, 20k, 20n, 20r, 20u and 20x are connected in series to a pair of terminals 114 and 115. Each of these pairs of terminals is connected to supply an input to an electrical integrator circuit followed by a threshold detector circuit included within the block shown at 125 in FIG. 7. The details of the integrator circuit and the threshold detectors constitute no part of the present invention and may be of conventional construction, such as that taught by volume 18 of the Radiation Laboratory series or any later transistorized version thereof.

In FIG. 3 in the upper central portion thereof there is shown in block form a control and timing circuit generally designated 135' of any convenient and conventional design supplying outputs by lead means 136 and 137 to the A phase pulse current source 53 and the B phase pulse current source 54, respectively. The control and timing circuit 135' has lead connections 139 and 140 to data processing equipment 142 as shown in FIG. 7, and also has a lead 138 connected in FIG. 7 to the aforementioned electrical integrators and threshold detectors shown in block form at 125, and has lead 148 connected to the "scan start" device 55, FIG. 3 and FIG. 4.

The data processing equipment 142 constitutes no part of the present invention and can be of any conventional or known design such as that taught by Hurley in "Junction Transistor Electronics," published by John W. Wiley.

As will be readily understood, the cores 20, 20c, 20f, 20i, 20l, 20p, 20s and 20v are sequentially read out or interrogated and induce signals in their respective sense windings 24 so that the signal arriving at the pair of terminals 106 and 107 may consist of a series of signals, and accordingly these electrical signals are applied to an electrical integrator circuit in the aforementioned apparatus 125, FIG. 7, and after electrical integration and application to a threshold detector, the outputs of the various groups of cores are supplied by lead means 141 to the data processing equipment generally designated 142, FIG. 7.

The number of integrator cores shown in FIG. 3 is illustrative only, and in actual practice a much larger number of integrator cores may be employed for example 600, to accommodate a receiver with 20 channels and employing an interrogation switch or scanner generally designated 143, FIG. 7, having thirty positions. The 600 cores could be arranged in 20 vertical rows and 30 horizontal rows. Twenty receivers (20 channels) each range gated to cover a predetermined portion of the interpulse interval would be provided. Assuming by way of example only a possible Doppler shift from 14,000 to 20,000 cycles per second, each range gated receiver would supply an output to 30 band-pass filters each covering a band of 200 cycles. The left-hand core in the upper horizontal row could be connected to the first receiver filter covering 14,000 to 14,200 cycles; the left-hand core in the second horizontal row (reading down) could be connected to the first receiver filter covering 14,200 to 14,400 cycles; the left hand core in the third horizontal row could be connected to the first receiver filter covering 14,400 to 14,600 cycles, etc. Referring again particularly to FIG. 3, the magnetic scanner is a high speed device consuming only a few microseconds per station. By reading out many cores at each station as is required in a multi-channel pulse Doppler radar, a large number of integrator cores, each corresponding to a channel of information can be switched in a short period of time. This is a requirement of modern pulse Doppler radar systems where many thousands of outputs must be switched and their outputs fed to a common destination. The scanner is under continuous control by the radar system and if desired for data organizing purposes the scanning process can be stopped in any position.

The operation of the scanner is not affected by the various flux levels the integrator cores may have before switching. The scanner output has sufficient pulse power capability to switch all the integrator cores in its line if necessary. If less flux is present the excess volt-seconds in the circuit will be dissipated in the resistor. During readout the integrator cores are reset to their cleared state. This is a system requirement for many pulse Doppler radars where the integrated signal information is not to be retained after readout.

The scanning function is performed by passive elements with their attendant advantages of reliability, stability, non-critical circuitry and economy. Since the cores utilized in systems of this type are quite small, the resulting unit is comparatively small in size and weight, an important requirement in avionic systems.

Figure 4:
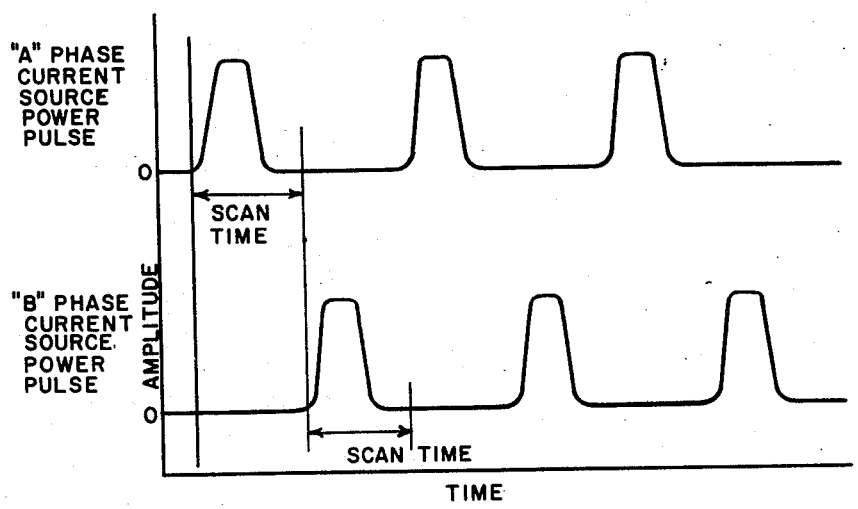
FIGURE 4 is a pair of graphs on the same time scale illustrating the time relationship of two groups of pulses which are used in providing the sequential interrogation of the integrator cores.
Figure 5:
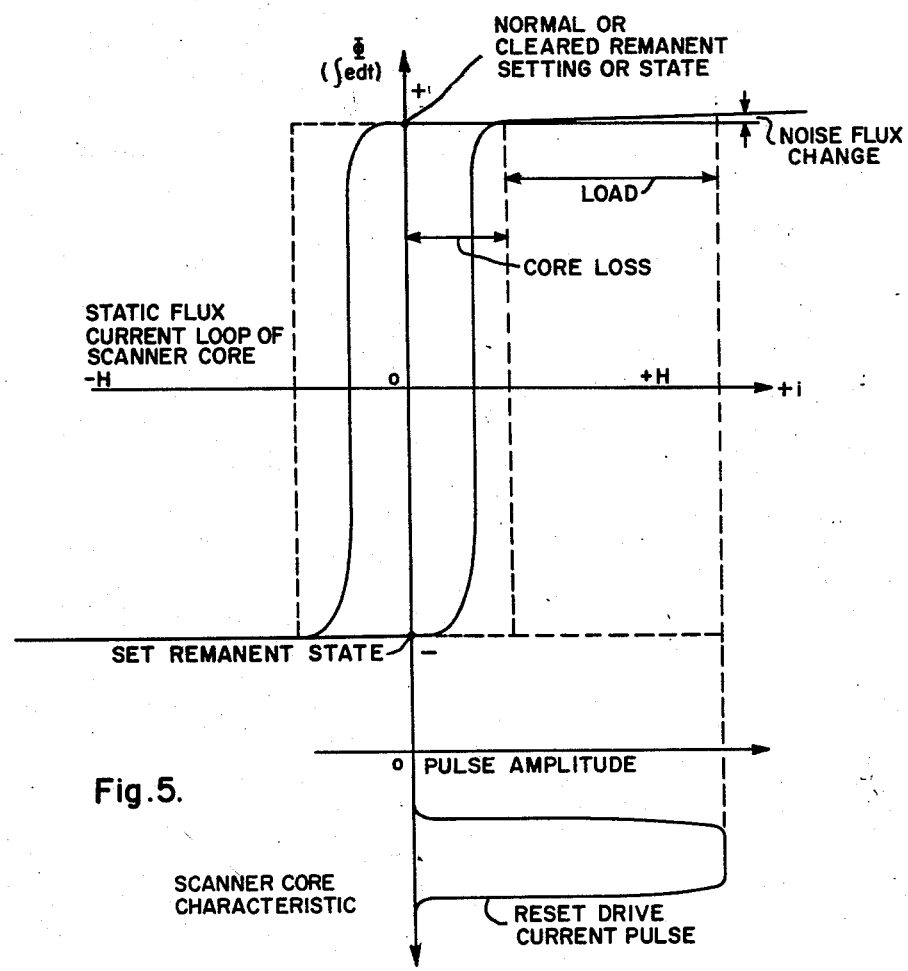
FIGURE 5 is a graph showing the magnetic characteristics and pulse effects on the magnetic core scanner devices which are utilized in controlling the aforementioned interrogation process.

Particular reference is made now to FIG. 6, in which there is shown a circuit for producing the pulses shown in the graphs of FIG. 4 and which may be utilized in the circuit of FIG. 3. Whereas conventional circuits may be used for the pulse current sources 53 and 54, the circuit of FIG. 6 is a functional schematic of a circuit which offers some advantages.

In FIG. 6, the portions of the circuit included in dashed outlines 153 and 154 correspond approximately to blocks 53 and 54, respectively. Timing pulses, which may also have a predetermined amplitude to provide an amplitude reference, may be applied by lead 136' from timer 135' to amplifier or comparison circuit 155 which has a feedback signal which may be derived from resistor 66 applied thereto by lead means 156. The output of amplifier or comparison circuit 155 is applied to both a clamping diode 157 and the base of a transistor 158, interconnected with two other transistors 159 and 160 and switching diode 161 in a pulse forming circuit using saturable square loop core 162 which has three windings 163, 164, and 165 thereon, winding 163 being connected in series with winding 166 on a linear core 167 which has an additional winding 168 thereon, as shown. Transistor 159 serves as a switch. The base of transistor 159 is connected by lead 171 and resistor 172 to negative terminal 173, and resistor 174 connects the base of transistor 160 to the negative terminal.

As will be readily understood, a non-switched scanner core with several turns forms a highly inductive load which would tend to produce "ringing" of a power transistor with a high collector junction parasitic capacitance. The circuit of block 153 avoids this by arranging the output stage of transistor 160 as a non-feedback emitter follower during the drive transition times; the L-C circuit "sees" a low impedance (voltage source) drive and is well damped and consequently free of oscillatory disturbances. When the current builds up to a certain value, the feedback loop is closed and the output stage, although emitter loaded, appears as a current source drive to the output circuit. Accordingly, the circuit of blocks 153 operates during a portion of the pulse generating cycle as an open loop voltage drive, and during a portion of the cycle as a closed loop feedback amplifier current drive.

Dots are used adjacent some windings, FIGS. 3 and 6 to indicate polarities, but the invention is not to be limited thereby, the arrangement of windings to obtain the desired relative polarities between signals being well within the capability of one skilled in the art.

It should be understood that core set and reset remanent states may be positive or negative as desired, suitable pulse polarities being chosen.

Whereas the invention has been shown and described with respect to an embodiment thereof which gives satisfactory results it should be understood that changes may be made and equivalents substituted without departing from the spirit and scope of the invention.

We claim as our invention:

1. A circuit for processing information in the form of electrical signals comprising, in combination, input terminals adapted to have applied thereto alternating current signals of a frequency in a predetermined frequency range varying in duration and amplitude in accordance with the information to be processed, filter means of predetermined band-width and covering a portion of said frequency range connected to said input terminals for limiting the signals passing through the filter means to information signals contained in the band-width portion of said frequency range, transistor means operatively connected to the filter means and having the output of the filter means applied thereto, a saturable magnetic core composed of square loop material and normally in a remanent state of predetermined polarity, a first winding on said core operatively connected to said transistor means, means for biasing and energizing the transistor means, the transistor means acting as a demodulator and applying the demodulated output to the first winding to cause a current flow therein, current flowing in said first winding causing a change in the magnetization of said core in an amount corresponding to the time duration and average amplitude of the information signals, second and third windings on said core, and means for applying a pulse of predetermined polarity and amplitude to the second winding to reset the core to said remanent state and induce a voltage in the third winding the amplitude of which is a function of the change in core magnetization caused by the information signals.

2. A scanning circuit for sequentially interrogating a plurality of magnetic core storage integrator means to obtain from the magnetic core storage integrator means a plurality of electrical signals proportional to the flux changes incurred by the magnetic core storage integrator means respectively in returning to a cleared state, comprising, in combination, first current pulse producing means for producing spaced pulses of predetermined shape, polarity and amplitude, second current pulse producing means for producing other spaced current pulses having a predetermined polarity, amplitude and wave shape and a predetermined time relationship with respect to the first-named pulses, first storage integrator means having a storage winding, an interrogation winding, a sense winding and a saturable core of square loop material, second storage integrator means having a storage winding, an interrogation winding, a sense winding and a saturable core of square loop material, a first magnetic core scanner device having a saturable core, a first winding, a second winding and a third winding, a second magnetic core scanner device having a saturable core, a first winding, a second winding and a third winding, means for applying a start pulse to the first winding of the first magnetic core scanner device to set the magnetic core thereof to remanence of one polarity, circuit means including in series a rectifier and the interrogation winding of the first storage integrator means connecting the third winding of the first magnetic core scanner device to the first winding of the second magnetic core scanner device, other circuit means connecting the first current pulse producing means to the second winding of the first magnetic core scanner device, pulses from the first current pulse producing means resetting the magnetic core of the first scanner device to remanence of the other polarity and inducing a voltage in the third winding of the first magnetic core scanner device, the resulting current flowing in the third winding of the first magnetic core scanner device flowing in said circuit means and in the interrogation winding of the first storage integration means resetting the core of the first storage integrator means to remanence and inducing a voltage in the sense winding of the first storage integration means whose volt-second area is proportional to the flux level stored in the core of the first magnetic storage integration means, said flux level being proportional to the integral of signals applied to the storage winding of the first storage integration means, the current in the circuit means interconnecting the third winding of the first magnetic core scanner device to the first winding of the second scanner device setting the magnetic core of the second scanner device to remanence of said one polarity, further circuit means connecting the second current pulse producing means to the second winding of the second scanner device, a pulse from the second current source applied to the second winding of the second scanner device resetting the core of the second scanner device to remanence of the other polarity and inducing a voltage in the third winding of the second magnetic core scanner device, and additional circuit means including a rectifier connecting the third winding of the second magnetic core scanner device to the interrogation winding of the second storage integration means, current flowing in the third winding of the second magnetic core scanner device and in said additional circuit means resetting the core of the second storage integration means to remanence and inducing a voltage in the sense winding of the second storage integration means whose volt second area is proportional to the flux level stored in the core of the second storage integration means, the voltage induced in the sense winding of the second magnetic core storage integration means following in time sequence the voltage induced in the sense winding of the first magnetic core storage integration means.

3. A circuit for sequential interrogation comprising, in combination, first and second magnetic core storage integration means each including a core, an interrogation winding, a sense winding and a storage winding, a first magnetic core scanner device having a saturable magnetic core and first, second and third windings, a second magnetic core scanner device having a saturable magnetic core and first, second and third windings, circuit means including rectifier means connecting the third winding of the first magnetic core scanner device in series with the interrogation winding of the first magnetic core storage integrator means and in series with the first winding of the second magnetic core scanner device, other circuit means including other rectifier means connecting the interrogation winding of the second magnetic core storage means to the third winding of the second magnetic core scanner device, means connected to the first winding of the first magnetic core scanner device for setting the core of the first magnetic core scanner device to remanence of one polarity, means for thereafter applying a pulse to the second winding of the first magnetic core scanner device for setting the core of the first scanner device to remanence of the other polarity while inducing a voltage in the third winding of the first scanner device, the current flowing in the last-named third winding and in the interrogation winding of the first storage integrator means resetting the core of the first storage integrator means to remanence while inducing a voltage in the sense winding thereof the volt-second area of which is proportional to the flux level stored in the core of the first magnetic core storage integrator means as a result of signals applied to the storage winding over a predetermined integration period, the current in the third winding of the first magnetic core scanner device also flowing in the first winding of the second magnetic core scanner device setting the core of the second magnetic core scanner device to remanence of said one polarity, and means connected to the second winding of the second magnetic core scanner device for thereafter applying a pulse of predetermined amplitude and polarity to the second winding of the second magnetic core scanner device, the pulse applied to the second winding of the second magnetic core scanner device setting the core of the second magnetic core scanner device to remanence of said other polarity while inducing a voltage in the third winding thereof connected by the other circuit means to the interrogation winding of the second storage integrator means, current flowing in the interrogation winding of the second storage integrator means resetting the core of the second storage integrator means to remanence and inducing a voltage in the sense winding of the second magnetic core storage integrator means, the volt-second area of which is proportional to the flux level stored in the core of the second magnetic core storage integrator means as a result of signals applied to the storage winding of the second storage integrator means over said integration period.

4. Apparatus according to claim 3 including in addition electrical integrator and threshold detector means operatively connected to both the sense winding of the first and second magnetic core storage integrator means to receive the outputs thereof, said electrical integrator and threshold detector means being adapted to supply a signal to data processing equipment operatively connected thereto.

5. In interrogation apparatus for sequentially interrogating a plurality of magnetic core storage integrator devices, in combination, a first magnetic core storage integrator device and a second magnetic core storage integrator device, first and second magnetic core scanner devices, first circuit means interconnecting the first magnetic core storage integrator device and the first and second magnetic core scanner devices, second circuit means interconnecting the second magnetic core storage integrator device and the second magnetic core scanner device, means for applying a first pulse of predetermined polarity and amplitude to the first magnetic core scanner device, the first magnetic core scanner device utilizing the first pulse to generate an interrogation signal which is applied to the first magnetic core storage integration device, said interrogation signal also setting the second magnetic core scanner device to a predetermined state, and means for thereafter applying a second pulse of predetermined polarity and amplitude to the second magnetic core scanner device, said last-named pulse causing said second magnetic core scanner device to produce in the second circuit means an additional interrogation signal which is applied to the second magnetic core storage integrator device.

6. Apparatus according to claim 5 including in addition means connected to the first magnetic core scanner device for initiating the scanning operation.

7. Magnetic core integrator and data extraction apparatus for use in Doppler radar including receiving apparatus for receiving a radar signal having a Doppler frequency shift within a predetermined frequency range comprising, in combination, a plurality of filters operatively connected to said receiving apparatus, each of the filters covering a predetermined band-width within said predetermined frequency range, all of said filters providing substantially continuous coverage of substantially the entire portion of said frequency range in discrete band-widths, a plurality of demodulator means operatively connected to the plurality of filter means respectively, a plurality of magnetic core storage integrator devices operatively connected to the plurality of demodulator means respectively, each of the magnetic core storage integrator devices having a storage winding connected to the demodulator means, a sense winding and an interrogation winding, and magnetic core scanner means operatively connected to the plurality of magnetic core storage integration devices for sequentially applying pulses to the interrogation windings to induce in the sense windings of the plurality of magnetic core storage integration devices electrical signals indicative of the flux levels in the cores of the storage-integrator devices.

8. In magnetic core integrator and scanner apparatus for use in Doppler radar having a receiver for receiving an echo with a Doppler shift in a predetermined frequency range, in combination, a plurality of filters including at least a first filter and a second filter connected to the receiver, the first filter and the second filter having predetermined frequency band-widths contiguous with each other and providing continuous coverage of the frequency range of the Doppler shift, first and second demodulator means operatively connected to the first and second filter means to receive the outputs therefrom, first and second magnetic core storage integrator means, each of the magnetic core storage integrator means having an interrogation winding, a sense winding and a storage winding, the storage windings of the first and second magnetic core storage integrator means being connected to the first and second demodulator means respectively, first and second magnetic core scanner devices, circuit means interconnecting the first magnetic core scanner device, the interrogation winding of the first magnetic core storage integrator means and the second magnetic core scanner device, other circuit means interconnecting the second magnetic core scanner device and the interrogation winding of the second magnetic core storage integrator means, means for applying a pulse of predetermined polarity and amplitude to the first magnetic core scanner device while the core of said first scanner device is in a predetermined state, said pulse causing current flow in the circuit means through the interrogation winding of the first magnetic core storage integrator means, said pulse in said last-named interrogation winding inducing a voltage in the sense winding of the first magnetic core storage integrator means which is a function of the flux level in the core of the first magnetic core storage integrator means, said flux level being indicative of the stored energy in response to signals to be integrated flowing in the storage winding of the first storage integrator means, the current in the circuit means also setting the core of the second magnetic core scanner device to a predetermined state, and means connected to the second magnetic core scanner device for thereafter applying an additional pulse of predetermined polarity and amplitude to the second magnetic core scanner device, the second magnetic core scanner device when the last-named pulse is applied thereto producing a current flow in the other circuit means and in the interrogation winding of the second magnetic core storage-integrator means, the current flowing in said last-named interrogation winding inducing a voltage in the sense winding of the second magnetic core storage-integrator means which is a function of the flux level in the core of the second magnetic core storage-integrator means, said last-named flux level being indicative of the stored energy therein in response to signals to be integrated flowing in the storage winding of the second magnetic core storage-integrator means.

9. In magnetic core storage and integrating apparatus, in combination, a magnetic core having a storage winding, a sense winding and an interrogation winding, said magnetic core being composed of a square loop material, circuit means connected to the interrogation winding for applying a pulse of predetermined amplitude thereto to reset the core to a position where no information is stored therein and the core is in a remanent state with the flux level of the core at a maximum level of a selected polarity, and means connected to the storage winding for applying signals to be integrated to the storage winding to change the flux level of the core to a value corresponding to the integrated value of the signals, the circuit means connected to the interrogation winding thereafter sending an additional pulse to the interrogation winding which induces a signal in the sense winding the total signal area of which represents the flux change incurred by the storage integrating core in returning to its remanent state thereby providing an electrical signal which is the derivative of the quantity stored in the magnetic core.

10. Apparatus according to claim 9 including in addition filter means, transistor demodulator means operatively connected to receive the output of the filter means, and circuit means connecting the transistor demodulator means to the storage winding, said filter means being adapted to be connected to a Doppler radar receiver and having a signal of a predetermined frequency within the Doppler shift frequency range applied thereto.

11. Storage integrator means comprising, in combination, a saturable magnetic core of square loop material, a storage winding, an interrogation winding, and a sense winding all inductively coupled to said core, said core being normally in a remanent state of predetermined polarity, means for applying signals to be integrated and having an amplitude above the threshold of the core to the storage winding to change the magnetization of said core in an amount corresponding to the time duration and average amplitude of said signals, and means for applying a pulse of predetermined polarity and amplitude to the interrogation winding to reset the core to said remanent state and induce a voltage in the sense winding the time integral of which is proportional to the flux level of said core before said pulse was applied to said interrogation winding.

12. Signal extracation apparatus for extracting coherent signal information from a spectrum of frequencies including non-coherent frequencies of random distribution and amplitude, said apparatus comprising: a source of a spectrum of frequencies including the desired coherent frequencies, a plurality of signal channels each having a selected bandwidth, said channels being substantially contiguous to embrace a desired band of frequencies having information-bearing significance, each of said channels having demodulator means for demodulating signals passing through the respective channels to produce unidirectional analogue signals of the coherent signal power in the respective channels, magnetic core storage integrator means operatively associated with each respective channel, each of said storage integrator means having an integrate drive winding connected to the demodulator means in the respective channels to integrate and store an analogue of the signal power in the respective channels, the integral being represented by a state of the remanent magnetization of the magnetic core, said integrator means also having an interrogate drive winding and an output winding, and means for sequentially applying interrogate drive pulses to the respective interrogate drive windings to induce in the respective output windings electrical output signals which are proportional to the total flux stored in the respective cores.

13. Signal extraction apparatus for extracting coherent signal information from a spectrum of frequencies including non-coherent frequencies of random distribution and random amplitudes, said apparatus comprising a plurality of frequency detection channels having selected bandwidths within the spectrum of frequencies having information-bearing significance, storage integrator means in each of said channels, each of said latter means including a saturable magnetic core of square loop material having an integrate drive and storage winding, an interrogate drive winding and an output or sense winding inductively coupled to said core, said core being normally in a remanent state of predetermined maximum polarity, rectifying means for producing unidirectional analogue signals of the coherent signal power in the respective channels to change the magnetization of said core by amounts corresponding to the time duration and average amplitude of said signals above that amplitude necessary to overcome the threshold of the domain walls of said material, and means for applying interrogate drive pulses to said interrogate windings to induce in the respective output windings electrical output signals which are substantially proportional to the total flux stored in the respective cores.

14. The combination as set forth in claim 13, in which said integrate drive windings and said interrogate drive windings have very high impedances whereby there is substantially no dissipation of the integrate pulses in the interrogate drive windings and substantially no dissipation of the readout signal in the integrate windings.

15. Signal translation apparatus comprising a plurality of frequency detection channels adapted to have impressed thereon a spectrum of frequencies including frequencies of information-bearing significance, each of said channels having rectifying means and magnetic core storage integrator means having a threshold characteristic in the form of the coercive force of the domain walls of said magnetic core so that only signals above a selected threshold power will be effective in said storage integrator means and means constituting an "or" circuit for reading out the stored integral of the signal power in the individual cores into a single electrical output circuit.

References Cited by the Examiner
UNITED STATES PATENTS
2,695,993  11/44  Haynes _____ 340—174

CHESTER L. JUSTUS, *Primary Examiner.*